(12) United States Patent
Lucke (10) Patent No.: US 7,225,127 B2
(45) Date of Patent: May 29, 2007

(54) METHOD FOR RECOGNIZING SPEECH

(75) Inventor: Helmut Lucke, Tokyo (JP)

(73) Assignee: Sony International (Europe) GmbH, Berlin (DE)

( * ) Notice: Subject to any disclaimer, the term of this patent is extended or adjusted under 35 U.S.C. 154(b) by 599 days.

(21) Appl. No.: 09/734,228

(22) Filed: Dec. 11, 2000

(65) Prior Publication Data
US 2001/0016816 A1  Aug. 23, 2001

(30) Foreign Application Priority Data
Dec. 13, 1999  (EP)  ................................ 99124759

(51) Int. Cl.
*G10L 15/00* (2006.01)
(52) U.S. Cl. ........................ 704/257; 704/10
(58) Field of Classification Search ............... 704/254, 704/256, 257, 275, 248, 221, 1, 252, 10; 701/10; 379/88.03
See application file for complete search history.

(56) References Cited

U.S. PATENT DOCUMENTS

| | | | | |
|---|---|---|---|---|
| 5,752,021 A | * | 5/1998 | Nakatsuyama et al. | 707/5 |
| 5,903,858 A | * | 5/1999 | Saraki | 704/4 |
| 5,905,773 A | * | 5/1999 | Wong | 379/88.03 |
| 6,021,384 A | * | 2/2000 | Gorin et al. | 704/1 |
| 6,067,510 A | * | 5/2000 | Kimura et al. | 704/7 |
| 6,070,140 A | * | 5/2000 | Tran | 704/275 |
| 6,092,039 A | * | 7/2000 | Zingher | 704/221 |
| 6,154,720 A | * | 11/2000 | Onishi et al. | 704/2 |
| 6,272,463 B1 | * | 8/2001 | Lapere | 704/248 |
| 6,587,822 B2 | * | 7/2003 | Brown et al. | 704/275 |

(Continued)

FOREIGN PATENT DOCUMENTS

EP  0 762 385  3/1997

(Continued)

OTHER PUBLICATIONS

J.Holmes and W. Holmes, Speech Synthesis And Recognition, 2nd Edition, 196-197 (2001).*

(Continued)

*Primary Examiner*—David Hudspeth
*Assistant Examiner*—Jakieda R. Jackson
(74) *Attorney, Agent, or Firm*—Frommer Lawrence & Haug LLP; William S. Frommer; Thomas F. Presson (57) ABSTRACT

Method for recognizing speech includes receiving a speech phrase, generating a signal being representative to the speech phrase, pre-processing and storing the signal with respect to a determined set of rules, generating from the pre-processed signal at least one series of hypothesis speech elements, and determining at least one series of words being most probable to correspond to the speech phrase by applying a predefined language model to at least said series of hypothesis speech elements. The determination of the series of words includes determining at least one sub-word, word, or a combination of words most probably being contained as a seed sub-phrase in the received speech phrase. The determination continues with determining words or combinations of words that are consistent with the seed sub-phrase as at least a first successive sub-phrase, which is contained in the received speech phrase, by using and evaluating additional and paired and/or higher order information between the sub-phrases, thereby decreasing the burden of searching.

16 Claims, 7 Drawing Sheets

U.S. PATENT DOCUMENTS

| | | | |
|---|---|---|---|
| 6,678,882 B1 * | 1/2004 | Hurley et al. | 717/121 |
| 6,714,936 B1 * | 3/2004 | Nevin, III | 707/102 |
| 2002/0128821 A1 * | 9/2002 | Ehsani et al. | 704/10 |

FOREIGN PATENT DOCUMENTS

| | | |
|---|---|---|
| EP | 0 833 303 | 4/1998 |

OTHER PUBLICATIONS

Sho-Ichi Matsunaga et al: "Continuous Speech Recognition Using a Dependency Grammar and Phoneme-Based HMMS" IEICE Transactions, JP, Institute of Electronics Information and Comm. Eng. Tokyo, vol. E74, No. 7, Jul. 1, 1991, pp. 1826-1833, XP000263046.

Young S R et al "High Level Knowledge Sources in Usable Speech Recognition Systems" Communications of the Association for Computing Machinery, US, Association for Computing Machinery. New York, vol. 32, No. 2, Feb. 1989, pp. 183-193, XP000253814.

* cited by examiner

METHOD FOR RECOGNIZING SPEECH

The present invention relates to a method for recognizing speech with a decreased burden of search within a set of possible recognized candidates.

Field of the Invention

BACKGROUND

Recently, devices and methods for recognizing continuously spoken speech automatically have become more and more important. There are indeed wide areas of services, such as information services, customer support or the like, in which a substantial amount of personal related costs could be avoided by utilizing devices which respond automatically to the customer's inquiries.

The most important condition which must be fulfilled by apparatuses and methods for automatic speech recognition is that these apparatuses and methods have to reliably recognize and understand the speech input given by the customer independently from the particular speaking conditions, such as speaking velocity, voice intonation, articulation, background noise or the like.

There are lots of devices, such as automatical telephone services, time schedule information services or the like, which work in a reliable manner only when applied in a well-defined and narrow area of all possible utterances made by the customer. These methods and devices are generally designed to manage a very narrow scope of vocabulary and vocal situations only.

In the field of large vocabulary speech recognition most methods and devices work as follows:

Upon receipt of a speech phrase a signal is generated which is representative for the received speech phrase. The signal is then pre-processed with respect to a predetermined set of rules which may include digitizing, Fourier-analyzing and like signal evaluation techniques. The result of pre-processing the signal is stored.

On the basis of the pre-processed signal at least one series of hypothetic speech elements is generated which serves as a basis for the determination of at least one series of words being a probable candidate to correspond to said received speech phrase. For the determination of the series of words a predefined language model has to be applied in particular to at least said series of hypothetic speech elements.

One major drawback of conventional methods and devices for large vocabulary speech recognition is the large complexity and the large number of possible candidates of speech fragments or elements to be searched for and to be tested. Without limiting the scope of subject-matter and therefore the scope of vocabulary, all possible candidates for speech elements or speech fragments have to be evaluated by distinct searching techniques.

SUMMARY

Therefore, it is the object of the present invention to provide a method for recognizing speech in which the burden of search within possible candidates of speech elements or speech fragments is reduced within the applied language model, so that recognition of speech is possible in a particular reliable manner with reduced time consumption.

That object is achieved by the inventive method for recognizing speech according to the wording of claim 1. Preferred embodiments of the inventive method are within the scope of the subclaims.

The inventive method comprises the steps of receiving a speech phrase and generating a signal being representative to that received speech phrase. The generated signal is pre-processed with respect to a predetermined set of rules and stored. The pre-processed signal is used for the generation of at least one series of hypothetic speech elements or fragments. The generated speech elements or speech fragments are used to determine at least one series of words being most probable to correspond to said received speech phrase.

Furthermore, in the inventive method during the determination of the series of words at first at least one sub-word, word or a combination of words most probably being contained in said received speech phrase is determined as a initial, starting or seed sub-phrase. Then words or combinations of words which are consistent with said seed sub-phrase and which are contained in said received speech phrase are determined as at least a first successive sub-phrase. The latter determination process is accomplished by using and evaluating additional and in particular paired and/or higher order information between the sub-phrases, thereby decreasing the burden of search within said language model.

One of the basic ideas of the inventive method is to determine at first at least one seed sub-phrase within the received speech phrase, which can be recognized with an appropriate high degree of reliability, i.e. with an adequate probability, or a plurality of possible candidate seed sub-phrases can be determined and be evaluated with respect to their probability.

Then, information and in particular the relationship of said determined starting or seed sub-phrase to other possible sub-phrases of the received speech phrase is evaluated and the additional information within the employed language model is used to describe and determine the other sub-phrases under avoidance of unnecessary search actions. The relationship between the sub-phrases and the additional information makes it possible to concentrate on the most prospect candidates of sub-phrases and to disregard candidates of sub-phrases which are probably not connected in one sense or another to the seed sub-phrase or a higher order sub-phrase.

In the inventive method segments of speech which can be recognized with high reliability are used to constrain the search in other areas of the speech signal where the language model employed cannot adequately restrict the search.

According to a particular embodiment of the inventive method a predefined language model is applied to at least said series of hypothesis speech elements to obtain said seed sub-phrase. Furthermore, said additional and paired and/or higher order information is obtained from said language model. Therefore, the determination process is accomplished by applying a predefined language model to the series of hypothesis speech elements or speech fragments.

In a preferred embodiment of the inventive method a language model is used in which as additional information semantic and/or pragmatic information or the like between the sub-phrases is employed.

Semantic information describes the information content per se. Instead, pragmatic information is connected with the actual situation, application, action or the like with respect to the interconnected sub-phrases, i.e. pragmatic information depends on the concrete realization of the connection between the sub-phrases.

According to a further preferred embodiment of the inventive method the additional information within said employed language model is realized as a description of prepositional relationships of the connected sub-phrases.

In particular, these prepositional relationships may describe the spatial, temporal and other relationships described by the sub-phrases.

According to a further preferred embodiment of the inventive method additional information within said employed language model is used, which is descriptive for pairs, triples and/or higher order and n-tuples of sub-phrases.

Therefore, it is possible to implement sentence/sub-sentence relationships into the language model as well as subject/object relationships.

The inventive method is of particular use if the language model used for the recognition process has at least one region where the signal can be recognized with relative certainty—i.e. a region where for example the word-perplexity is relatively low—said region being embedded in other regions where the probability of correct recognition is much lower, i.e. there the word-perplexity is relatively high.

It is therefore advantageous to use a language model which contains at least a recognition grammar—in particular of low perplexity or low-complexity—built up by at least a low-perplexity part and a high perplexity part, each of which being representative for distinct low- and high-perplexity or -complexity classes of speech fragments or elements.

The notion perplexity describes the complexity or the depth of search which has to be accomplished in conventional search graphs or search trees. Therefore, it describes the branching level of the search graph or search tree.

The inventive method therefore simplifies searching for proper candidates by identifying within the utterance at least one region where the speech elements are recognized with high reliability. The other parts or sub-phrases of the received speech phrase are treated as high-perplexity or high-complexity parts.

The searching for proper candidates as recognized sub-phrases therefore splits up the whole phrase into at least one low-perplexity or low-complexity part, which can be analyzed and recognized with high degree of reliability. The other parts or sub-phrases of the received speech phrase are treated as high-perplexity or high-complexity parts.

In a further preferred embodiment the identification is achieved by having certain segments of a grammar or language model being marked as so-called "low-perplexity regions", i.e. regions in which the speech elements are recognized with relative reliability.

In other embodiments it may be that the high reliability of a segment is recognized by analyzing the recognition process itself, for example by calculating a measure of confidence.

In a further preferred embodiment of the inventive method word classes or subword classes are used as classes for speech fragments or elements.

Of course, even more atomic speech fragments or elements, such as phonemes or syllables may be used. But the usage of words or subwords simplifies the extraction process, because the combination of words or subwords is much more closer to the actual speech phrase to be recognized than the combination of a phonemes or syllables.

According to a further preferred embodiment of the inventive method it is advantageous to use a language model in which the low-perplexity re-cognition grammar is obtained from a conventional recognition grammar. With such a method a conventional recognition grammar can be used, modified and successfully employed to improve conventional recognition methods in a simple and unexpensive manner by identifying and extracting word classes of high-perplexity from the conventional grammar. Further, a phonetic, phonemic and/or syllabic description of the high-perplexity word classes is generated, in particular by applying a subword-unit grammar compiler to them. This results in a production of a subword-unit grammar—in particular of high perplexity—for each high-perplexity word class. Finally, subword-unit grammars have to be merged with the remaining low-perplexity part of the conventional grammar as to yield a complete low-perplexity recognition grammar.

In a further embodiment of the inventive method a hypothesis graph is generated for the received speech phrase including the generated sub-phrases and/or their combinations as candidates for the received speech phrase to be recognized. Additional information between the sub-phrases is used to constrain and to restrict the search for the most probable candidate within the hypothesis graph.

It is preferred that during the search for candidate sub-phrases subwords from the high-perplexity word classes are inserted into the hypothesis graph. The subword-unit grammar for the high-perplexity word classes are used as well as the respective additional semantic and/or pragmatic information as constraints for the search.

To finally produce the most probable candidate or candidates for the received speech phrase to be recognized the base hypotheses are extended under the restriction imposed by the constraints. A scoring method may be used to track a likelihood of language model, accoustic evidence and additional constraints. When a hypothesis is expanded to account for all of the received speech signals it is output. It is possible to suppress the output of a hypothesis if it is significantly worse than other hypotheses. Such suppression could occur before a hypothesis has been fully expanded. In the extreme case only A*-search which is well-known in the art can be used to accomplish the hypothesis expansion efficiently.

Therefore, the constraints may be used to delete less probable candidates from the hypothesis graph so as to decrease the burden of search, in particular until an unbranched resulting graph is generated, which corresponds to and describes the most probable candidate for the received speech phrase to be recognized.

The inventive method as described above at least pairs regions of high-perplexity or complexity with regions of low complexity or perplexity—which can be recognized with a high degree of reliability—and further uses the information gained by recognizing the low-perplexity region from the set of additional semantic or pragmatic information to determine the high-perplexity region. Therefore, the low-perplexity region, which can be easily recognized, together with the additional content of information serves as a description for the segments of speech which can only be recognized with a much lower degree of reliability.

For a speaker such pairings between low- and high-perplexity regions are quite natural. The user and speaker in general intuitively uses such pairings or higher order structures between sections or sub-phrases of received speech phrases.

In accordance with another preferred embodiment of the inventive method the vocabulary—in particular of said language model—applicable for the remaining parts of the speech phrase besides the seed sub-phrase is restricted at least for one remaining part, so as to decrease a burden of search.

The inventive method for recognizing speech will be explained in more detail by means of a schematical drawing on the basis of preferred embodiments, in which

DETAILED DESCRIPTION

Figure 1:
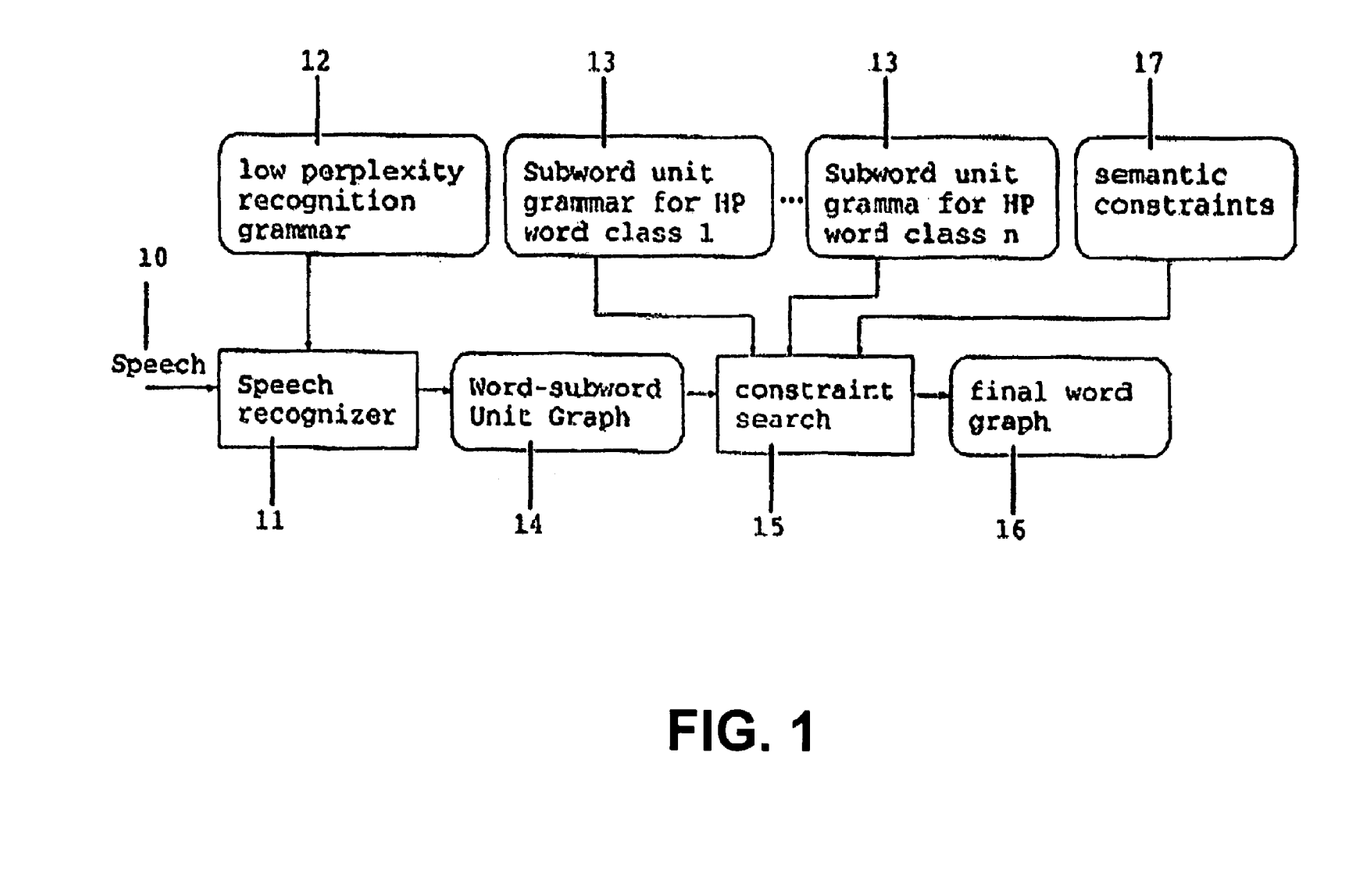
FIG. 1 shows a schematical block diagram representative for a preferred embodiment of the inventive method.

FIG. 1 shows in a schematical block diagram the speech recognition process according to the inventive method.

Through an input channel a speech input 10 is fed into a speech recognizer 11. The speech recognizer uses a low-perplexity recognition grammar 12 according to the language model to be applied.

As a result of the analysis done by the speech recognizer 11 a word/subword unit graph 14 is output. By using subword-unit grammars for high-perplexity word classes 13 a constraint search process 15 is applied to the output word/subword-unit graph 14. Under addition of further semantic and pragmatic information semantic constraints 17 are fed into the constraint search process 15 resulting in a final word graph 16 which is representative to said speech phrase to be recognized.

In the embodiment of FIG. 1 the word/subword unit graph 14 generated by the speech recognizer 11 serves as a hypothesis graph made up of words and sub-word-units. As described above, an additional constraints search process 15 inserts further candidate words or subwords from the original high-perplexity word classes into the hypothesis graph 14. This is accomplished by utilizing subword-unit grammars for the high-perplexity word classes 13 and, as described above, further pragmatic and semantic (sentence) constraints 17. Subword-units are deleted from the hypothesis graph 14 and the resulting graph contains as a final word graph 16 only words. So the final word graph 16 can be output as the recognized result corresponding to the received speech phrase.

Another embodiment according to FIG. 1 could be realized as by establishing two kinds or two levels of hypotheses the first of which being the hypothesis graph 14 generated by the speech recognizer 11 of FIG. 1. The search then begins with the most probable recognized fragments and includes an expansion into the less probable recognized parts using the constraints. Thereby, further hypotheses are generated which are controlled and organized in a separated data structure. In said separated data structure word or sentence hypotheses are generated and—if necessary—cancelled in the case of a bad evaluation. Finally, the separated or second data structure contains one or several hypotheses which may be output. According to that particular embodiment the subword units are not cancelled from the first hypothesis graph in the first data structure. The sub-word hypotheses within a given sentence-hypothesis in the first data structure—which do not have meaning there—may be important and of certain value for another sentence hypothesis.

Figure 2:
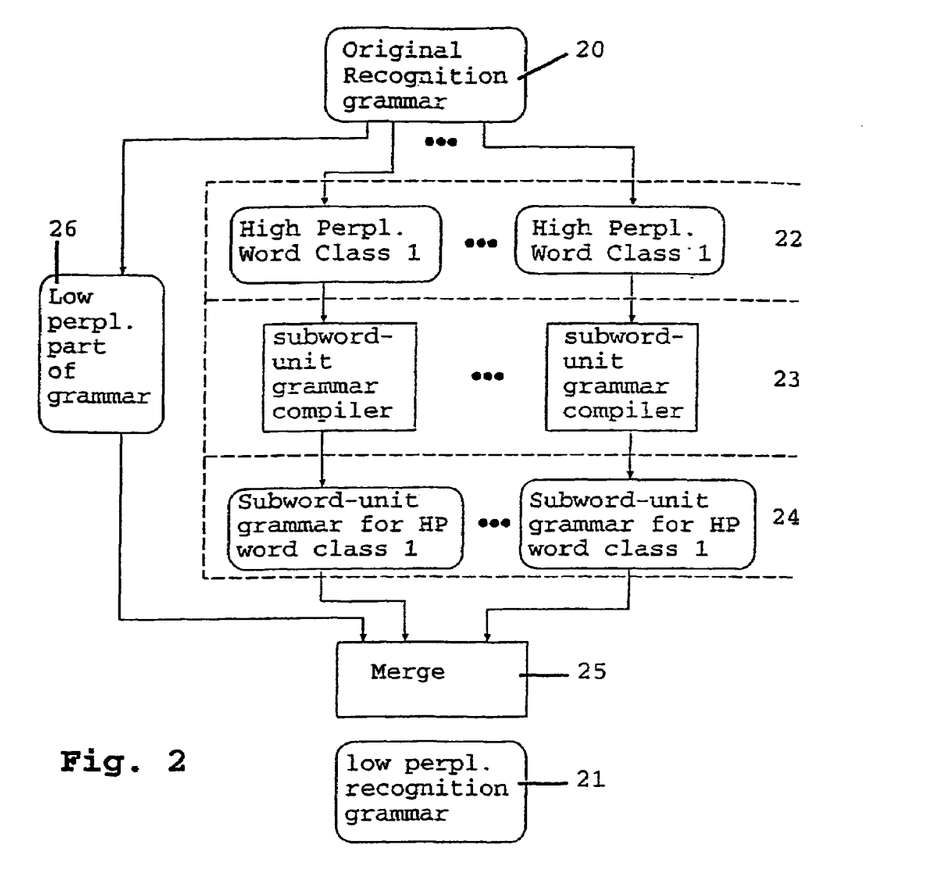
FIG. 2 shows a block diagram representative for the generation of a low-perplexity recognition grammar as employed by an preferred embodiment of the inventive method.

The grammar or language model used in the example for the inventive method according to FIG. 1 may be derived as a low-perplexity recognition grammar 21 from an original recognition grammar 20 of conventional structure according to a procedure shown in FIG. 2 by means of the schematical block diagram.

The original recognition grammar 20 is split up into high-perplexity word classes 22 for classes 1 to n. On the other hand, the remaining part of the original grammar 20 is treated as a low-perplexity part of the grammar 26.

In a further step 23 the high-perplexity word classes 22 for word classes 1 to n are fed into subword-unit grammar compilers to result in step 24 in subword-unit grammars for high complexity word classes 1 to n.

In a successive step 25 the low-perplexity part 26 of the original recognition grammar 20 and the derived sub-unit grammars 24 for the high-perplexity word classes 1 to n are merged to yield the low-perplexity recognition grammar 21 to be applied within the constraint search 15 of the preferred embodiment of the inventive method according to FIG. 1.

In general, the generation of the low-perplexity recognition grammar is done prior to the recognition process. One or more word classes of high-perplexity—for example city names, personal names or the like—are identified in the original recognition grammar and the classes are extracted. The subword-unit grammar compiler produces in each case of the high-perplexity word classes 1 to n an adequate description of these high-perplexity word classes in terms of subword-units in the sense of combinations of phonems or syllables. Then the compiled grammars are re-inserted into the remaining low-perplexity part of the original recognition grammar to create the final low-perplexity recognition grammar used for the speech recognition process according to the inventive method.

It is therefore important for the inventive method that the high-perplexity region or high-perplexity part of the original recognition grammar is exchanged by a low-perplexity grammar. Nevertheless, the low-perplexity grammar is capable of covering all words or sub-words of the original high-perplexity recognition grammar. This matter of fact is enabled by changing the length of the speech fragments or speech units from length of a word to length of a syllable. Therefore, the notion "perplexity" could be specified with respect to the respective speech fragments or speech units. Therefore, the notions "high word perplexity" and "low syllable perplexity" etc. could be used.

Figure 3A:
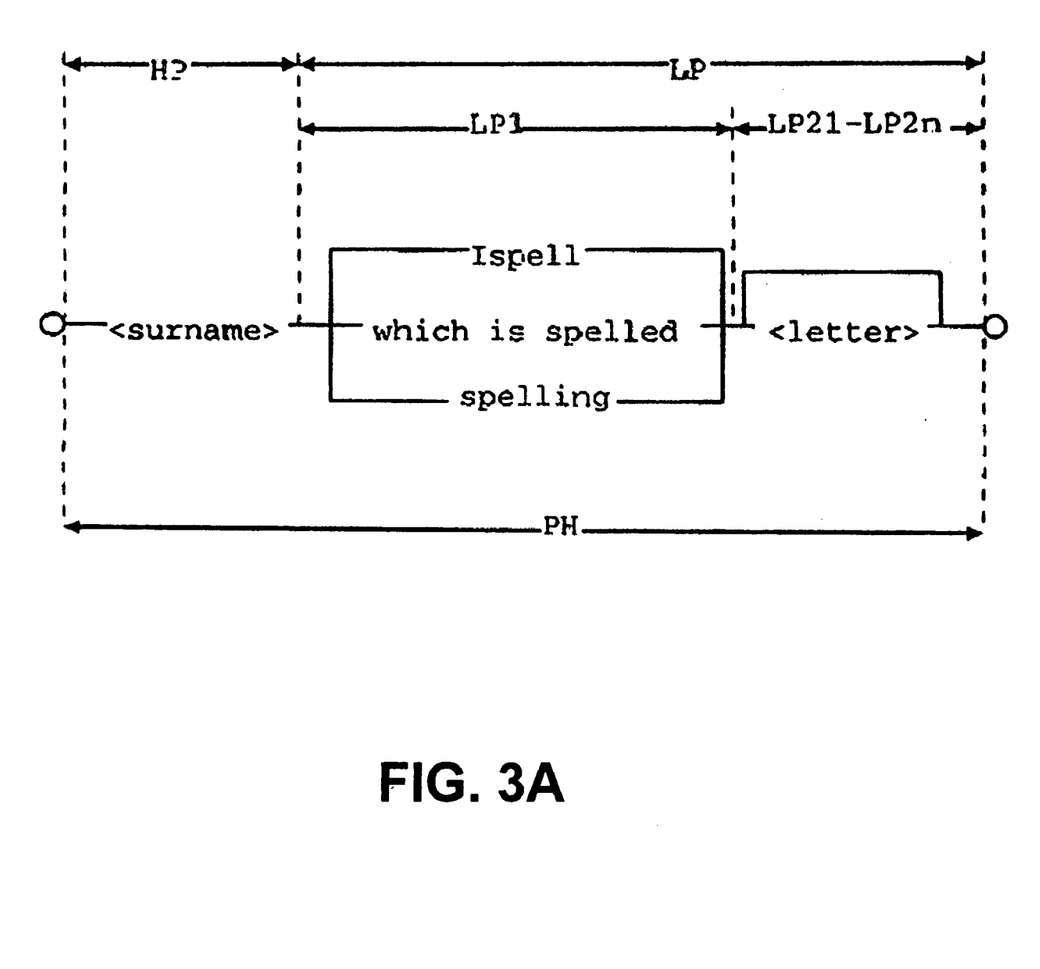
FIGS. 3A–3C show the temporal relationship of low- and high-perplexity sub-phrases.
Figure 3B:
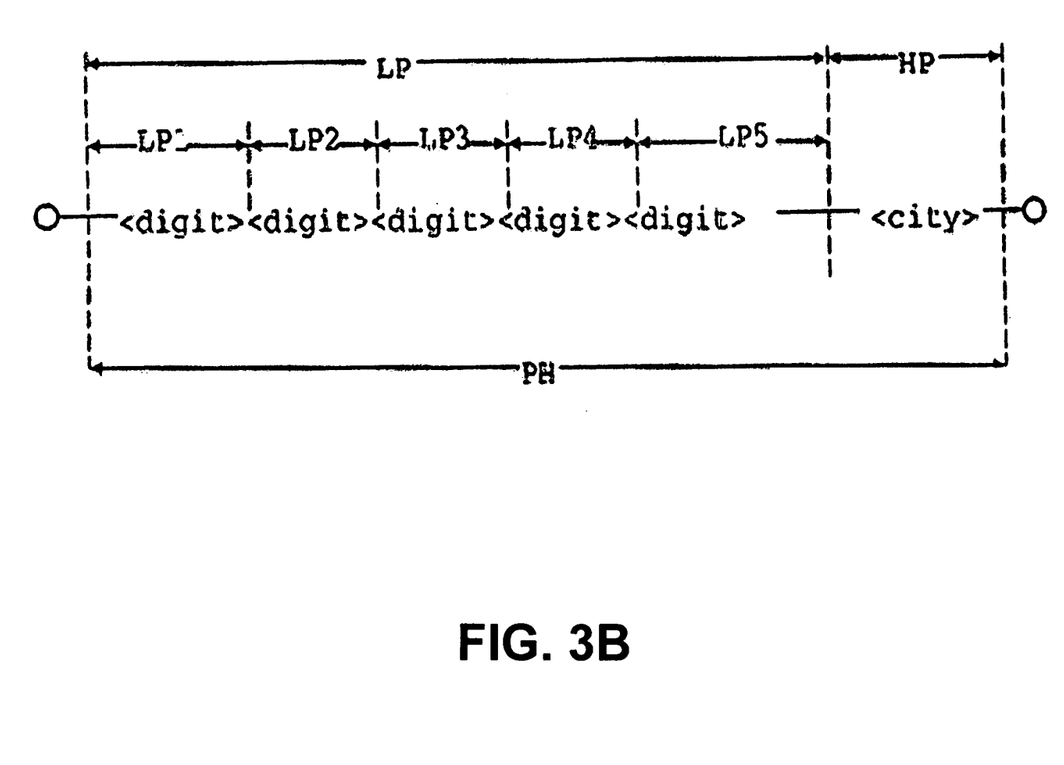
Figure 3C:
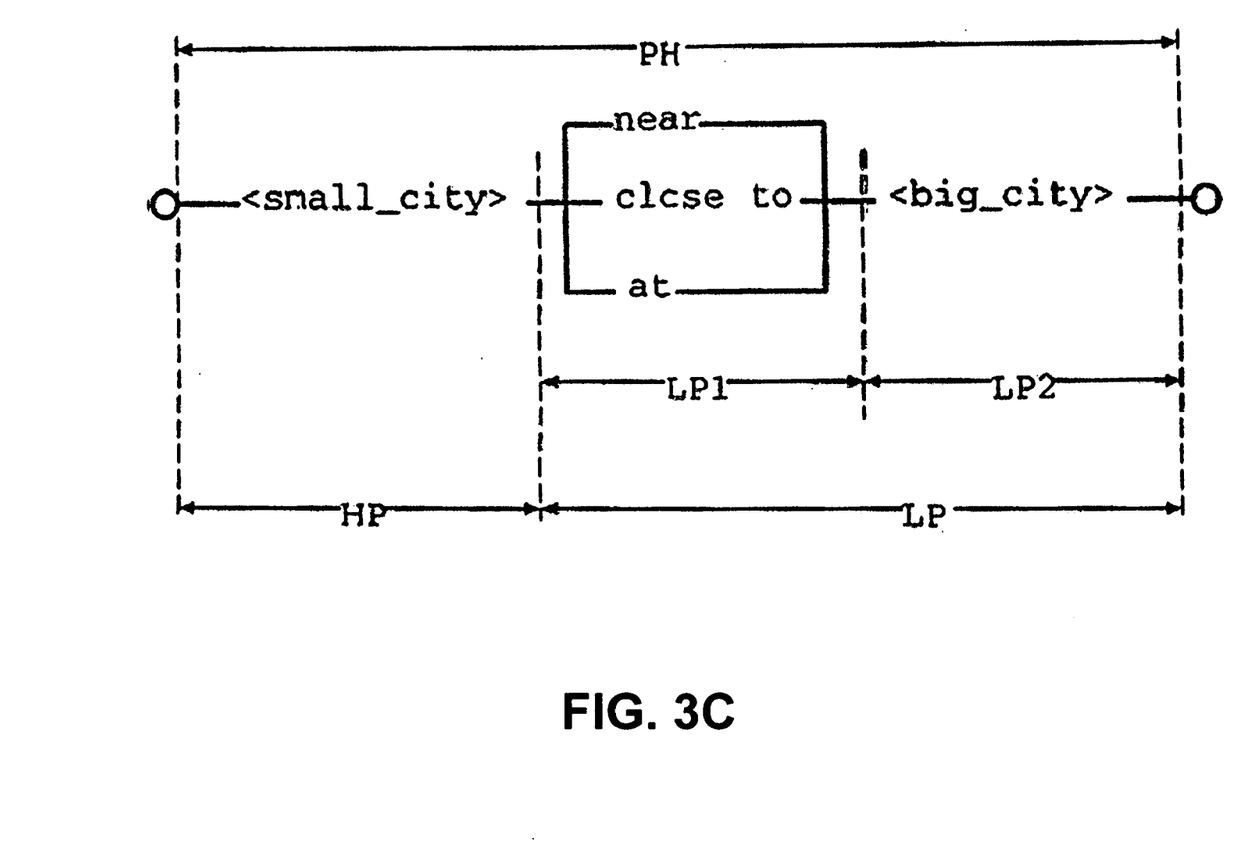

FIGS. 3A, 3B, 3C show different relationships of high- and low-perplexity parts of fragments within different received speech phrases. As can be seen from these examples, within a given phrase PH of speech the low-perplexity part LP may follow the high-perplexity part HP as shown in FIG. 3A. The low-perplexity part LP may also preceed a high-perplexity part HP within a given phrase PH as shown in FIG. 3B.

In the syntax diagram given in FIG. 3A the phrase PH is representative for a situation during which the speaker introduces his surname by spelling it.

The speech element or fragment representing the surname defines the high-perplexity part HP of the phrase PH being followed by the explanatory low-perplexity part LP. The low-perplexity part LP may be subdivided in the most reliably recognizable introducing part LP1, which announces the spelling process, and the spelling part, being built up by low-perplexity parts LP21 to LP2$n$.

In the case of FIG. 3A the explanation for the high-perplexity part HP is contained in a part of the low-perplexity part LP, i.e. in the spelling sequence built up by the low-perplexity parts LP21 to LP2$n$. This is an example where the low-perplexity part itself contains pragmatic information with respect to the high-perplexity part HP to be explained by the low-perplexity part LP.

Another example of a low-perplexity part LP containing pragmatic information about the high-perplexity part HP is given in the syntax diagram of FIG. 3B.

There, the low-perplexity part LP of the phrase PH precedes the high-perplexity part HP of the phrase PH. This diagram describes the situation where the name of the city is described by its postal code, in Germany being built up by a series of 5 integer digits.

Thus, the language model or the low-perplexity recognition grammar contains the semantic information that German cities may be described by their name, constituting the high-perplexity part HP, and on the other hand a 5-digit postal code. Furthermore, the low-perplexity part LP contains the pragmatic information of the 5-digit postal code per se. Each digit LP1–LP5 itself forms a low-perplexity subpart, as integer digits can be recognized with a very high degree of reliability.

Therefore, in the examples of FIGS. 3A and 3B the semantic information and the pragmatic information between low-perplexity parts LP and high-perplexity parts HP of the phrase PH indicates particular candidates which can be inserted into a hypothesis word graph to reduce the burden of search for the most probable candidate representative for the received speech phrase to be recognized.

In the example of FIG. 3C the phrase PH to be recognized again is built up by a preceding high-perplexity part HP and a following low-perplexity part LP.

In this case geographic entries are described with respect to each other regarding their local relationship with respect to the notion of neighbourhood.

The low-perplexity part LP may be subdivided in a first low-perplexity part LP1 and a following second low-perplexity part LP2, the latter describing the name of a big city, whereas the first low-perplexity part LP1 introduces the notion of neighbourhood between a small city, described by the high-perplexity part HP of the phrase PH, and the big city.

In this example of FIG. 3C the semantic information of the language model includes the knowledge that small cities may be characterized by their local arrangement near a big city. Therefore, the search among all small cities can be constrained to the subset of small cities which are close to or nearby the recognized big city in one sense or another.

Figure 4:
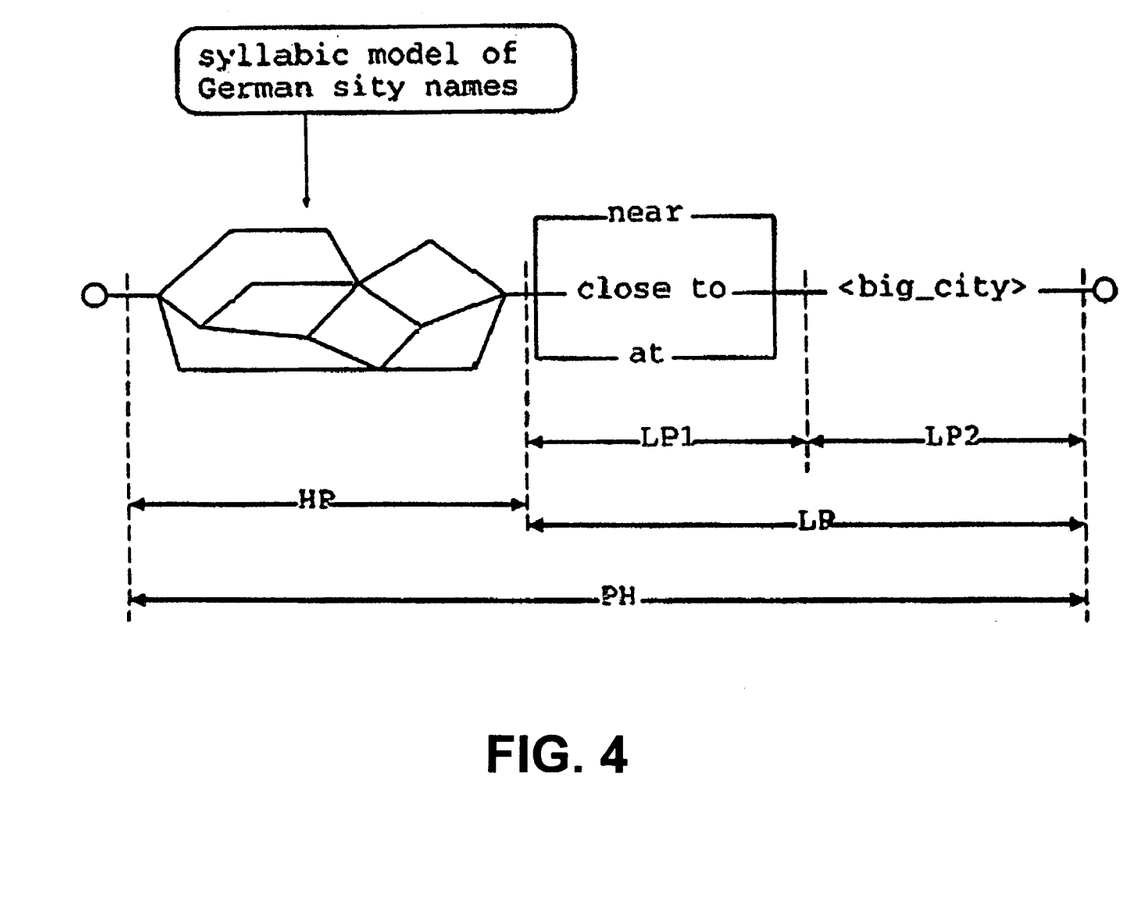
FIG. 4 shows another representing structure for the example of FIG. 3C.

In FIG. 4 the example of FIG. 3C the reanalyzed using a syllabic model for names of small cities. Additionally to the semantic and pragmatic information the syllabic model information may be introduced to further reduce the burden of search with respect to finding the proper name of the small city described by the high-perplexity part HP of the received phrase PH.

Figure 5:
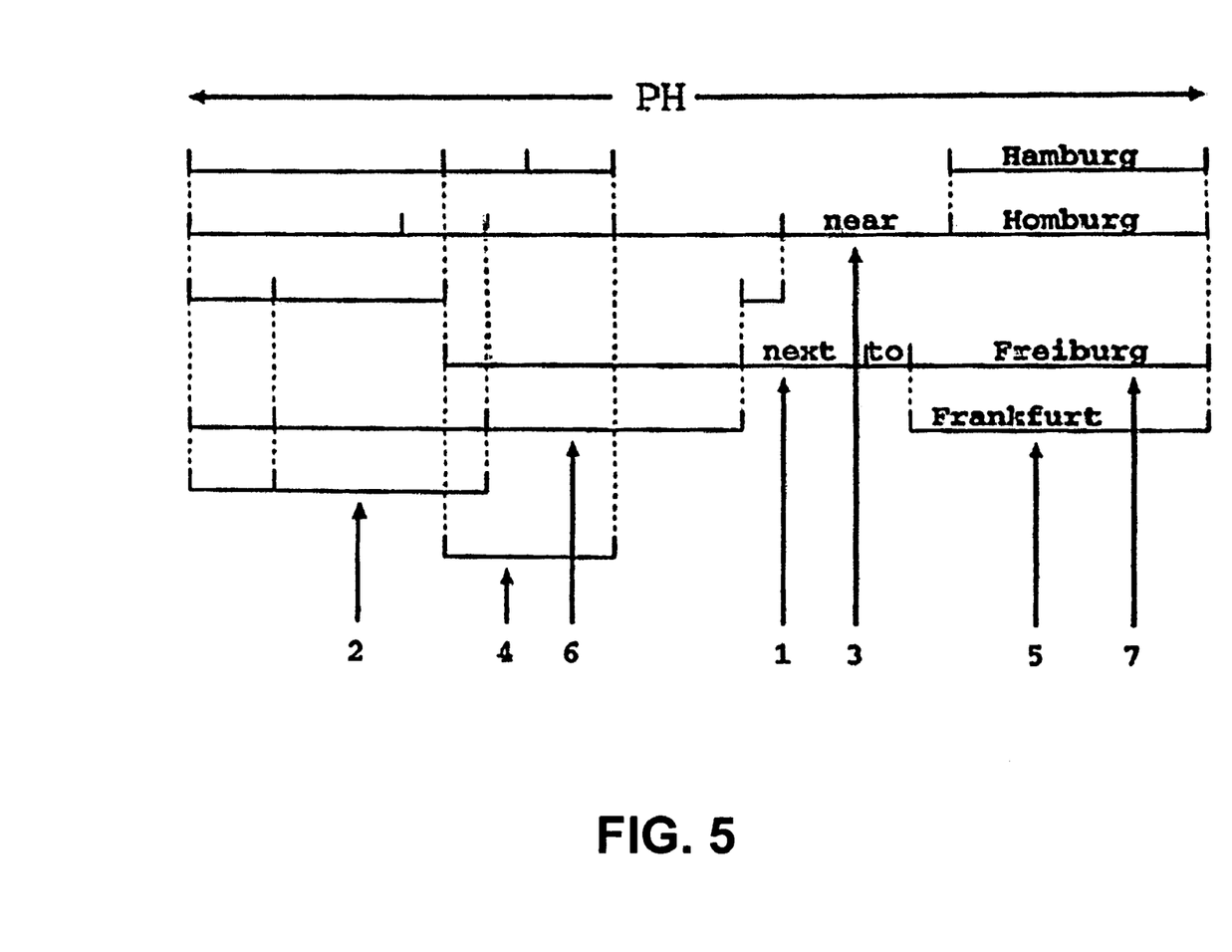
FIG. 5 shows a typical hypothesis graph with low- and high-perplexity regions as analyzed by the inventive method.

In FIG. 5 the hypothesis word graph for the example of FIGS. 3C and 4 is shown schematically.

The hypothesis word graph for a received phase PH is built up by sequences of subword units—1, 3, 5, 7 for example—matched in low-perplexity regions of the grammar and by sequences of subword units—2, 4, 6 for example—found in high-perplexity regions of the grammar. In general, in contrast to the grammar, the word graph per se cannot be split up into high- and low-perplexity regions.

The sub-word units 1, 3 here describe the notion of neighbourhood between cities and sub-word units 5, 7 show the candidates for the cities.

Dependent on the candidate for the city to be chosen from low-perplexity part of the grammar the series of subword units has to be analyzed to find the proper candidate within the high-perplexity region of the grammar.

In some cases the additional semantic and/or pragmatic information provided by the low-perplexity part of the grammar might not be sufficient to determine the high-perplexity sub-word units of the utterance or the phrase. But nevertheless, the addition of semantic and/or pragmatic information may reduce the complexity and perplexity of a given phrase.

The inventive method explores the relationship between a speech element or grammatical fragment of high-perplexity and an element corresponding to a portion of the grammar with much lower perplexity, the latter serving as a description or explanation for the former. High-perplexity fragments or elements are often found when word classes—for example as the class of the street names, surnames, city names or the like—comprising a large number of words—e.g. names or the like—oral combinations of words and word classes in succession—with a large number of possible candidates or realizations for a series of words representing the received speech phrase to be recognized—are used in the grammar or language model.

The corresponding low-perplexity fragment or element can be a word, a class of words or a succession of words or word classes which can be recognized much easier and with an higher degree of probability and reliability.

In a preferred implementation of the inventive method the language model or the low perplex recognition grammar contains an additional database of high-perplexity grammar fragments together with their paired low-perplexity counterparts. Usually such a database is a part of the grammar structure, and the language model is used by the recognition process and it may be embedded in such a grammar.

In such a grammar also the relative locations for the low and the high-perplexity fragments are indicated and, as shown in FIGS. 3A, 3B and 3C, these locations may vary.

Furthermore, for each high-perplexity fragment or element a grammatical or formal description in terms of a limited number of smaller units in the sense of the language model may be given. These smaller units may be phonemes, phonetic elements or syllables or the like. Therefore, the description of the high-perplexity parts can also be realized in terms of a syllabic or phonemic grammar for such expressions.

Such a part of a grammar may be expressed according to the variety of well-known formats, among which the finite-state and the context-free format are examples to express the phonetic, phonemic and phontetic relationships being present within the high-perplexity parts of the received phrase.

For the example of FIG. 3C FIG. 4 shows such a grammar including a syllabic model based on a finite-state syllable grammar.

A grammar fragment as shown in FIG. 4 may be embedded into a much richer grammar. It is possible to embedd more than one high- and low-perplexity part within the same grammar. Such a grammar in which the high-perplexity parts are represented by a sub-unit model can be referred to as the recognition grammar.

Of course, well-known state of the art recognizer and recognizing methods can be employed to match the recognition grammar against the input utterance and produce a number of utterance hypotheses. According to common practice, such multiple hypotheses may be represented in form of hypothesis graphs. Each graph, each possible word, sub-word or sub-phrase that is matched by the recognizer forms an entry of the graph. Usually, each entry is aligned to the time interval it corresponds to in the utterance. Further, a given word may occur more than once in the graph in which case it is usually aligned to different time intervals. To each word there is also assigned a score which may represent the likelihood or the probability of the word representing the particular time interval and which is used to determine the most probable and therefore the best word series or sequence.

Words, sub-words or sub-phrases corresponding to sections of the low-perplexity grammar can usually be recognized with a higher accuracy and reliability than words, sub-words or sub-phrases corresponding to the sections of the grammar of high-perplexity.

In the examples given in the figures the syllable model for city names in the graph represented by FIG. 4 will contain different syllable entries and there will be many different paths or branches to the graph corresponding to different syllable sequences. Therefore, different city names appear to be possible, while there will be much fewer paths or branches to the latter corresponding to the low-perplexity sections of the phrase PH.

In a preferred implementation of the inventive method for recognizing speech the search is started after recreation of the word graph shown for example in FIG. 5 as a hypothesis graph. The search starts with words, word sequences or the like present in the hypothesis graph matched in and corresponding to low-perplexity fragments or sections of the grammar or the language model employed for recognizing the received phrase.

These word sequences—in FIG. 5 the four names for big cities—form the base hypotheses. Each base hypothesis is expanded to words, sub-words or sub-phrases either preceding or following it. The distinct direction depends upon whether the sub-word unit matched in the high-perplexity section precedes or follows the sub-word unit matched in the low-perplexity section that the base hypothesis corresponds to. That means, that the base hypothesis is expanded into the sub-word units of high perplexity within the hypothesis word graph.

In general, there will be many possible sequences that can be constructed from the sub-word units of high perplexity. And in general, the sub-word units of high perplexity will be distributed over the hypothesis word graph dependent on the base hypothesis, so that a strict deconstruction of the word graph into an LP and HP region is—in contrast to the grammar—not possible.

However, as shown above, the base hypothesis provides additional information about the sequence of possible sub-word units. This information is used to restrict and to constrain the search space by disregarding sub-word sequences, which are not consistent with the base hypothesis. In this way, a limited number of consistent recognition results can be generated as possible candidates for a series of words corresponding to the received speech phrase to be recognized.

Furthermore, by applying a search technique known as A*-search it is possible to analyze the multiple base hypothesis simultaneously to find a consistent hypothesis with highest likelihood or probability, even without an exhausted search.

The invention claimed is:

1. A method for recognizing speech, comprising:
   (a) receiving a speech phrase;
   (b) generating a signal being representative to said speech phrase;
   (c) pre-processing and storing said signal with respect to a determined set of rules;
   (d) generating from said pre-processed signal at least one series of hypothesis speech elements;
   (e) determining at least one series of words being most probable to correspond to said speech phrase by applying a predefined language model to said at least one series of hypothesis speech elements,
   wherein determining said at least one series of words further comprises:
   (1) determining at least one sub-word, word, or a combination of words most probably being contained as a seed sub-phrase in said received speech phrase,
   wherein said seed sub-phrase is recognized with an appropriate high degree of reliability, such that segments of speech that are recognized with high reliability are used to constrain the search in other areas of the speech signal where the language model employed cannot adequately restrict the search; and
   (2) continuing determining words or combinations of words, which are consistent with said seed sub-phrase as at least a first successive sub-phrase which is contained in said received speech phrase, by inserting additional, paired and/or higher order information, including semantic and/or pragmatic information, between the sub-phrases, thereby decreasing the burden of searching,
   wherein said semantic information includes description of said sub-phrases and said pragmatic information includes connecting information connecting said sub-phrases to actual situation, application, and/or action,
   wherein the predefined language model contains a low-perplexity recognition grammar obtained from a conventional recognition grammar by:
   (3) identifying and extracting word classes of high-perplexity from the conventional grammar;
   (4) generating a phonetic, phonemic and/or syllabic description of the high-perplexity word classes, in particular by applying a sub-word-unit grammar compiler to them, to produce a sub-word-unit grammar for each high-perplexity word class; and
   (5) merging the sub-word-unit grammars with the remaining low-perplexity part of the conventional grammar to yield said low-perplexity recognition grammar; and
   wherein a language model is used containing at least a recognition grammar built up by at least a low-perplexity part and a high-perplexity part, each of which being representative for distinct low- and high-perplexity classes of speech elements; and
   wherein word classes are used as classes for speech elements or fragments.

2. Method according to claim 1, characterized in that a predefined language model is applied to at least said series of hypothesis speech elements to obtain said seed sub-phrase and said additional and paired and/or higher order information is obtained from said language model.

3. Method according to claim 1, characterized in that additional information within said language model is used being descriptive for the prepositional relationship of the sub-phrases.

4. Method according to claim 1, characterized in that additional information within that language model is used being descriptive for pairs, triples and/or higher order n-tuples of sub-phrases.

5. Method according to claim 1, characterized in that a hypothetic graph is generated for the received speech phrase including the generated sub-phrases and/or their combinations as candidates for the recognized speech phrase and that additional information between the sub-phrases is used to constrain and to restrict the search for the most probable candidate within the graph.

6. Method according to claim 5, characterized in that during the search candidate sub-phrases or sub-words from the high-perplexity word classes are inserted into the hypothesis graph, whereby the sub-word unit grammars for the high-perplexity word classes are used as constraints as well as the respective additional semantic and/or pragmatic information.

7. Method according to claim 6, characterized in that according to the constraints candidates are deleted from the hypothesis graph until an unbranched resulting graph is generated, corresponding to the most probable phrase.

8. Method according to claim 1, characterized in that the vocabulary—in particular of said language model—applicable for the remaining parts of the speech phrase besides the seed sub-phrase is restricted at least for one remaining part so as to decrease the burden of search.

9. The method of claim 1, wherein said seed sub-phrase recognized with an appropriate high degree of reliability is defined as a low perplexity part of said received speech phrase.

10. The method of claim 9, wherein perplexity is defined as the complexity of the depth of search which has to be accomplished in conventional search graphs or search trees.

11. An apparatus for recognizing speech, comprising:
(a) means for receiving a speech phrase;
(b) means for generating a signal being representative to said speech phrase;
(c) means for pre-processing and storing said signal with respect to a determined set of rules;
(d) means for generating from said pre-processed signal at least one series of hypothesis speech elements;
(e) means for determining at least one series of words being most probable to correspond to said speech phrase by applying a predefined language model to said at least one series of hypothesis speech elements,
wherein said means for determining said at least one series of words further comprises:
(1) means for determining at least one sub-word, word, or a combination of words most probably being contained as a seed sub-phrase in said received speech phrase,
wherein said seed sub-phrase is recognized with an appropriate high degree of reliability, such that segments of speech which can be recognized with high reliability are used to constrain the search in other areas of the speech signal where the language model employed cannot adequately restrict the search; and
(2) means for continuing determining words or combinations of words, which are consistent with said seed sub-phrase as at least a first successive sub-phrase which is contained in said received speech phrase, by inserting additional, paired and/or higher order information, including semantic and/or pragmatic information, between the sub-phrases, thereby decreasing the burden of searching,
wherein said semantic information includes description of said sub-phrases and said pragmatic information includes connecting information connecting said sub-phrases to actual situation, application, and/or action, and
wherein the predefined language model includes a low-perplexity recognition grammar obtained from a conventional recognition grammar by using:
(3) means for identifying and extracting word classes of high-perplexity from the conventional grammar;
(4) means for generating a phonetic, phonemic and/or syllabic description of the high-perplexity word classes, in particular by applying a sub-word-unit grammar compiler to them, to produce a sub-word-unit grammar for each high-perplexity word class;
(5) means for merging the sub-word-unit grammars with the remaining low-perplexity part of the conventional grammar to yield said low-perplexity recognition grammar; and
wherein a language model is used containing at least a recognition grammar built up by at least a low-perplexity part and a high-perplexity part, each of which being representative for distinct low- and high-perplexity classes of speech elements; and
wherein word classes are used as classes for speech elements or fragments.

12. The apparatus of claim 11, wherein said semantic information includes information relating to grammatical constraints among said sub-phrases.

13. The apparatus of claim 12, wherein said information relating to grammatical constraints include grammatical constraints for a name of a city.

14. The apparatus of claim 13, wherein said pragmatic information includes a 5-digit postal code for the city.

15. The apparatus of claim 11, wherein said seed sub-phrase recognized with an appropriate high degree of reliability is defined as a low perplexity part of said received speech phrase.

16. The apparatus of claim 15, wherein perplexity is defined as the complexity of the depth of search which has to be accomplished in conventional search graphs or search trees.

* * * * *